(12) United States Patent
Brehm et al.

(10) Patent No.: US 9,459,385 B2
(45) Date of Patent: Oct. 4, 2016

(54) FILM AND METHOD FOR PRODUCING SAME

(75) Inventors: Ludwig Brehm, Adelsdorf (DE); Hans Peter Bezold, Sulzbach-Rosenberg (DE); Dieter Geim, Thalmassing (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 112 days.

(21) Appl. No.: 14/119,482

(22) PCT Filed: May 24, 2012

(86) PCT No.: PCT/EP2012/059657
§ 371 (c)(1),
(2), (4) Date: Feb. 14, 2014

(87) PCT Pub. No.: WO2012/160122
PCT Pub. Date: Nov. 29, 2012

(65) Prior Publication Data
US 2014/0177057 A1    Jun. 26, 2014

(30) Foreign Application Priority Data
May 24, 2011    (DE) .......... 10 2011 102 999

(51) Int. Cl.
*G02B 5/18* (2006.01)
*B42D 25/425* (2014.01)
(Continued)

(52) U.S. Cl.
CPC .......... *G02B 5/1861* (2013.01); *B42D 25/00* (2014.10); *B42D 25/29* (2014.10); *B42D 25/425* (2014.10); *G02B 5/1847* (2013.01); *B41M 3/14* (2013.01); *B42D 25/324* (2014.10); *B42D 25/328* (2014.10); *B42D 2033/06* (2013.01); *B42D 2033/10* (2013.01); *B42D 2033/18* (2013.01); *B42D 2033/20* (2013.01); *B42D 2033/24* (2013.01); *B42D 2035/14* (2013.01); *B42D 2035/16* (2013.01); *B42D 2035/24* (2013.01)

(58) Field of Classification Search
CPC .. G02B 5/1861; G02B 5/1847; B24D 25/00;
B24D 25/29; B24D 25/425; B42D 15/0013;
B42D 25/00; B42D 25/29; B42D 25/425
USPC .............. 359/558–576; 283/85–86; 428/172;
430/200
See application file for complete search history.

(56) References Cited

U.S. PATENT DOCUMENTS 5,310,222 A * 5/1994 Chatwin et al. ................ 283/86
5,714,231 A * 2/1998 Reinhart ........................ 428/156
(Continued)

FOREIGN PATENT DOCUMENTS

AU           686009      3/1996
JP         2000218908    8/2000
(Continued)

*Primary Examiner* — Scott J Sugarman
*Assistant Examiner* — Kristina Deherrera
(74) *Attorney, Agent, or Firm* — Hoffman & Baron, LLP (57) ABSTRACT

A film and a process for its production includes a light-permeable replication lacquer layer with a diffractive relief structure formed in a first side of the replication lacquer layer, a light-permeable color lacquer layer, formed only in areas, arranged on the relief structure, and a reflective layer, formed at least in areas, arranged on the first side of the replication lacquer layer. In areas of the film where the color lacquer layer and the reflective layer overlap, the color lacquer layer is arranged between the replication lacquer layer and the reflective layer.

19 Claims, 3 Drawing Sheets

(51) Int. Cl.
  *B42D 25/29* (2014.01)
  *B42D 25/00* (2014.01)
  *B41M 3/14* (2006.01)
  *B42D 25/324* (2014.01)
  *B42D 25/328* (2014.01)

(56) References Cited

U.S. PATENT DOCUMENTS

| | | | |
|---|---|---|---|
| 7,368,217 B2* | 5/2008 | Lutz et al. | 430/200 |
| 7,821,716 B2 | 10/2010 | Staub et al. | |
| 8,343,615 B2 | 1/2013 | Raksha et al. | |
| 8,692,445 B2* | 4/2014 | Lee et al. | 313/112 |
| 2004/0051297 A1 | 3/2004 | Raksha et al. | |
| 2005/0260386 A1 | 11/2005 | Heinrich et al. | |
| 2007/0017075 A1 | 1/2007 | Nguyen | |
| 2007/0165309 A1* | 7/2007 | Laakkonen et al. | 359/567 |
| 2009/0081428 A1 | 3/2009 | Keller et al. | |
| 2009/0268295 A1* | 10/2009 | Miller | 359/576 |
| 2010/0045024 A1 | 2/2010 | Attner et al. | |
| 2011/0007374 A1 | 1/2011 | Heim | |
| 2012/0156446 A1 | 6/2012 | Brehm et al. | |

FOREIGN PATENT DOCUMENTS

| | | |
|---|---|---|
| JP | 2005535484 | 11/2005 |
| JP | 2007292899 | 11/2007 |
| JP | 2010518432 | 5/2010 |
| UA | 77738 | 10/2004 |
| WO | WO9607552 | 3/1996 |
| WO | WO2009100831 | 8/2009 |

* cited by examiner

FILM AND METHOD FOR PRODUCING SAME

This application claims priority based on an International Application filed under the Patent Cooperation Treaty, PCT/EP2012/059657, filed on May 24, 2012, and German Application No. DE 102011102999.4, filed on May 24, 2011.

BACKGROUND OF THE INVENTION

The invention relates to a film which has a replication lacquer layer with a diffractive relief structure formed thereupon as well as a transparent colour lacquer layer, a security paper, a value document and a transfer film with such a film, as well as a production process for such a film.

It is known to equip value documents with security elements which, in the form of flexible film elements, display a diffractive, optically variable effect. This can be achieved by a surface relief structure which is stamped in a replication lacquer layer and the visibility of which is improved by provision of a reflective layer, in particular in the form of a reflective metal surface. Such security elements are quite generally classed with so-called OVDs (OVD=Optically Variable Device). Additional features of such security elements such as coloured areas are desirable for protection against forgery and for aesthetic reasons. For this, the replication lacquer layer can be dyed. However, this technology reaches its limits when multicolour diffractive elements or high flexibility in terms of colouring is desired.

U.S. Pat. No. 5,714,231 A (see also DE 4313521 A) relates to the provision of structures with an optical-diffraction effect only in a region-wise manner, corresponding structures are thus to be destroyed in order to prevent the diffractive effects in a region-wise manner. As a solution, it is proposed to completely emboss a decorative layer and then to apply a cover lacquer layer in areas where no optical-diffraction effect is to be provided. An observer forms the impression that the structure is present only in the desired region, in particular because depressions and raised portions are leveled off. Furthermore, a reflecting layer is also provided above the lacquer layer. The reflecting layer is also substantially flat in areas where the cover lacquer layer is present.

SUMMARY OF THE INVENTION

The object of the invention now is to provide an improved diffractive film element with coloured areas and a corresponding production process.

The object is achieved by a film which comprises a light-permeable replication lacquer layer with a diffractive relief structure formed in a first side of the replication lacquer layer, a light-permeable colour lacquer layer, formed only in areas, arranged on the relief structure, and a reflective layer, formed at least in areas, arranged on the first side of the replication lacquer layer, wherein, in areas of the film in which the colour lacquer layer and the reflective layer overlap, the colour lacquer layer is arranged between the replication lacquer layer and the reflective layer, wherein the colour lacquer layer is formed in a pattern or as a grid, and i) adjacent pattern or grid elements of the colour lacquer layer have a reciprocal distance which lies in a range of from 50 to 250 µm, preferably of from 70 to 200 µm, and/or ii) a line width, a dot diameter or an individual element diameter of the pattern or grid elements lies in a range of from 50 to 250 µm, preferably of from 70 to 200 µm. The object is also achieved by a process for producing a film according to one of claims 1 to 11, wherein a) a diffractive relief structure is formed in a first side of a light-permeable replication lacquer layer, b) after step a) a light-permeable colour lacquer layer is applied only in areas to the relief structure, with the result that the colour lacquer layer is formed in a pattern or as a grid, and i) adjacent pattern or grid elements of the colour lacquer layer have a reciprocal distance which lies in a range of from 50 to 250 µm, preferably of from 70 to 200 µm, and/or ii) a line width, a dot diameter or an individual element diameter of the pattern or grid elements lies in a range of from 50 to 250 µm, preferably of from 70 to 200 µm, and c) after step b) a reflective layer, preferably in the form of a metal layer, is applied at least in areas to the first side of the replication lacquer layer.

A transparent or translucent layer is called light-permeable if at least 50%, in particular at least 80% of the incident visible light in the wavelength range of 380 to 780 nm passes through the layer.

The invention overcomes the technical prejudice that, because of the filling or levelling of the relief structure by the colour lacquer layer, printing a colour lacquer layer over a diffractive relief structure of a replication lacquer layer leads to the diffractive effect of the relief structure being destroyed and is thus not practically possible. Here, the invention uses the knowledge that with a suitable overprinting of the relief structure only in areas, the diffractive effect of the relief structure is reduced or destroyed only in the overprinted areas. Due to the limited resolution capacity of the naked eye of a human observer the individual areas of the relief structure not overprinted are joined to each other such that an observer sees an uninterrupted OVD. As a consequence both the diffractive effect and the chrominance of the colour lacquer can still be seen sufficiently well.

The proposed invention offers the advantage of high flexibility: with a customary transparent replication lacquer a diffractive structure is produced and depending on the desired design, a chrominance is achieved in all areas of the diffractive structure, by imprinting the diffractive structure with a transparent colour lacquer which is visible through the replication lacquer layer and endows chrominance on the diffractive structure.

Advantageous embodiments of the invention are described in the dependent claims.

It is preferred if the colour lacquer layer is arranged directly on the relief structure.

Preferably the light-permeable replication lacquer is formed by a transparent replication lacquer in the form of a thermoplastic lacquer or a thermally curing lacquer.

Preferably a lacquer of PMMA and cellulose esters (PMMA=polymethyl methacrylate) is used as replication lacquer. The thickness of the replication lacquer layer is preferably 0.5 to 10 µm, further preferably 0.5 to 5 µm. It is possible to use a colourless lacquer as replication lacquer. Alternatively, however, a dyed lacquer can also be used which in combination with the colour lacquer layer brings about combined coloured effects. For example in areas of the film in which the two dyed transparent lacquer layers, i.e. the replication lacquer layer and the colour lacquer layer, overlap, a further colour impression can be produced by subtractive colour mixing. For example overlapping cyan-blue and yellow colour layers produce a green colour impression and overlapping yellow and magenta-red colour layers an orange colour impression.

The replication lacquer layer has for example been formed from a lacquer of the following composition (in g):

| | |
|---|---|
| 12000 | Methyl ethyl ketone |
| 1000 | Diacetone alcohol |
| 1500 | Methyl methacrylate-based acrylic polymer (Molecular weight approx. 150,000-200,000 au (=atomic units)) |
| 2750 | Cellulose nitrate wetted with denatured ethanol, 35% ethanol content |
| 500 | Polyisocyanate based on isophorone diisocyanate |

The reflective layer is preferably formed as a metal layer, in particular a vapour-deposited or sputter-deposited metal layer, consisting of any metal such as aluminium, chromium, nickel, copper, silver, gold or a metal alloy. It is also possible for an HRI (High Refractive Index) layer or a sequence of HRI layers to serve as reflective layer. It is also possible for a reflective layer to be formed by printing on a metallic dye. The thickness of the reflective layer is preferably 5 to 100 nm, more preferably 10 to 50 nm. The reflective layer can be formed over the whole surface or partially. In the latter case the reflective layer can be designed in the form of a grid or a pattern, e.g. in the form of a pattern which is matched to a pattern or grid of the colour lacquer layer and/or relief structure.

It is possible for the reflective layer to be partially formed by printing on a metallic dye in areas. Alternatively in step c) a reflective layer produced over the whole surface can be partially removed again, preferably by a demetallization process. For example, for this an etch resist can be printed on in areas and the exposed metal areas etched off. Before applying the reflective layer it is also possible to print on a liftoff lacquer, in areas, which, after application of the reflective layer, is washed off together with the overlapping reflective layer. Demetallization with a photomask and photo lacquer is also possible. A further demetallization process involves a metal layer of varying thickness which results during vapour deposition on structures with varying depth-breadth ratio; on this point reference is made to patent specification DE-B4-102005006231.

The pattern or grid of the colour lacquer layer can be formed e.g. as a straight, wavy or circular line grid made up of individual linear elements. It is possible for the colour lacquer to be printed linear, wherein the lines can also be curved. An example of this is a circle-line grid, wherein nested circles are printed. This has the advantage that the dye area has a clearly defined outer edge.

The pattern or grid can e.g. also be formed as a pattern consisting of geometric individual elements such as dots, squares, rectangles, diamonds, characters, logos or symbols, a grid image, produced by auto-typical or frequency-modulated arrangement in a grid of a half-tone image, of individual grid elements, in particular grid points, or a similar pattern. It is possible for the colour lacquer layer to be formed as a dot grid or cluster grid, wherein the colour lacquer is printed virtually in the form of "islands of colour", the distribution of which can be uniform or also random, e.g. by means of so-called "error diffusion". The colour lacquer layer can also be built up from several colours, wherein the individual colours are applied preferably in successive printing steps. It is possible to apply the individual colours in each case in an aforementioned grid and thereby produce a multicolour grid image. For example, a true-colour image can be produced using the colours CMYK (C=cyan, M=magenta, Y=yellow, K (=key)=black) in the known manner of four-colour printing. Tests have shown that, to produce specific true-colour images, also only three components CMY or also only two components, e.g. CM, are sufficient. Similarly, the use of more than four colour components is possible, e.g. six colour components as in the Pantone Hexachrome® system with the colours cyan, magenta, yellow, green, orange, black. Alternatively, it is possible to use so-called mixed colours or spot colours, e.g. from the Pantone® or HKS colour system, to produce colour images.

It is preferable if, compared with the diffractive design of the relief structure underneath, the colour lacquer grid is designed such that no Moiré effects occur. This means for example that the colour lacquer grid and the relief structure do not have the same design, but have different designs. If, namely, the design were the same, undesired Moiré effects would occur because of register tolerances and position offset.

Because adjacent pattern or grid elements of the colour lacquer layer have a reciprocal distance which lies below approx. 250 to 300 µm, preferably below the resolution capacity of the naked eye, a human observer sees the film as an uninterrupted colour surface in the area of the gridded or patterned colour lacquer layer in spite of its arrangement in a grid or pattern. The lower limit of the reciprocal distance of adjacent pattern or grid elements (in a range of from 50 to 250 µm, further preferably of from 70 to 200 µm) is limited by the printing technique, in particular gravure printing, used to apply the colour lacquer.

If a line width, a dot diameter or an individual element diameter of the pattern or grid elements lies below approx. 250 to 300 µm, preferably below the resolution capacity of the naked eye, the diffractive effect of the relief structure is visible for the human observer continuous and uninterrupted in spite of being overprinted by the colour lacquer layer attenuating or destroying the diffractive effect. Preferably the maximum extent of the grid elements lies in a range of from 50 to 250 µm, further preferably of from 70 to 200 µm.

In a preferred embodiment the colour lacquer layer has a thickness in a range of from 0.1 to 6 µm, preferably of from 0.2 to 4 µm. It is advantageous if the colour lacquer layer is printed, preferably using gravure, silk screen or flexographic printing. The smaller the layer thickness of the colour lacquer layer is, the less colour lacquer is available for filling the relief structures and the better the relief structure remains preserved on the side of the colour lacquer layer facing away from the relief structure, and is thus optically effective.

The colour lacquer preferably consists of at most 25 wt.-%, in particular at most 20 wt.-% colouring agents, i.e. pigments and/or colourants, and at least 75 wt.-%, in particular at least 80 wt.-% binders, in particular aromatic binders.

A composition of the colour lacquer with pigments is in particular formed such that it does not attack, etch nor dissolve the replication lacquer layer, with the result that the relief structure remains unchanged. The composition for forming the at least one colour lacquer layer can thus neither destroy, blunt nor otherwise impair the diffractive relief structure formed in the replication lacquer layer. The profile shape of the relief structure remains unchanged. The at least one colour lacquer layer is formed on a solidified replication lacquer layer in which the diffractive relief structure is moulded.

It is preferred if a composition for forming a colour lacquer layer is formed from a pigmented colour lacquer of the following composition:

| | |
|---|---|
| 0-50 wt.-% | water |
| 1-15 wt.-% | isopropanol |

-continued

| 1-25 wt.-% | colour pigment(s), in particular Mikrolith ® WA dispersion |
| --- | --- |
| 0.1-2 wt.-% | ammonia solution (25%) |
| 0.05-1 wt.-% | defoamer |
| 25-90 wt.-% | alkaline acrylate dispersion (polyacrylic acid copolymer) |
| 0.1-1 wt.-% | aziridine hardener |

The polymer dispersion and/or polymer emulsion and/or polymer solution functions here in particular as film-forming substance. It has proved worthwhile if an acrylate polymer emulsion, an acrylate copolymer emulsion or an anionic acrylate copolymer emulsion is used as polymer emulsion. Furthermore it has proved worthwhile if polyacrylic acid is used as polymer dispersion.

It is preferred if a composition for forming a colour lacquer layer is formed from a colour lacquer with dyes of the following composition (in g):

| Ethanol | 3500 |
| --- | --- |
| Ethyl acetate | 3500 |
| n-butanol | 400 |
| SMA resin (molecular weight approx. 200,000 au, acid number approx. 250) | 1000 |
| Alcohol-soluble cellulose nitrate (standard 30 A) | 100 |
| Complex dye orange | 95 |
| Complex dye yellow | 40 |

The viscosity of the colour lacquer is to be matched to the layer thickness of the colour lacquer layer and the shape of the relief structure such that no undesired running of the colour lacquer beyond limits of the colour lacquer layer predetermined by the arrangement in a grid occurs. The colour lacquer shows preferably thixotropic behaviour, i.e. it does not run or does so only insubstantially once printed on the relief structure.

According to a preferred development of the invention the overlaying of the surface of the relief structure with the colour lacquer layer lies in a range of from 5 to 95%, preferably of from 25 to 75%, further preferably of from 45 to 55% of the whole surface of the relief structure. In other words, preferably 5 to 95%, preferably 25 to 75%, further preferably 45 to 55% of the whole surface of the relief structure is covered by the colour lacquer layer. It has been proven that the best results with regard to a simultaneous recognizability of the diffractive effect and the colour lacquer layer are achieved with an overlaying of the surface in the range of 50%.

The attenuation of the colour impression caused by reducing the overlaying of the surface of the relief structure with the colour lacquer layer can be compensated for to a certain degree by a change in the colour tone of the colour lacquer, namely by a stronger dying of the lacquer, i.e. by a higher saturation and/or a darker colour. As a result of this, in a preferred embodiment of the production process, the colour lacquer used to form the colour lacquer layer is more strongly dyed if the overlaying of the surface of the relief structure with the colour lacquer layer is less.

Any diffractive surface relief can serve as relief structure, e.g. an asymmetrical sawtooth structure (blaze structure), a kinoform structure, a cross grating structure, an isotropic or anisotropic matte structure, free-form elements, a KINEGRAM® or combinations of the aforementioned relief structure forms. The profile shape of the relief structure can be semicylindrical, hemispherical, trapezoidal or triangular. In a preferred embodiment the depth of the relief structure lies in a range of from 50 to 2000 nm, preferably of from 100 to 500 nm. By depth is meant the maximum height difference between "peaks and valleys" of the relief structure. In the case of a linear sawtooth structure the depth is the same as the height of the teeth.

In a preferred embodiment the relief structure is a linear structure with a line frequency in a range of from 100 to 1000 lines/mm, preferably of from 100 to 500 lines/mm. The smaller the grating constant of a linear structure, i.e. the distance between adjacent peaks or adjacent valleys, the sooner the relief of such a linear structure is filled or bridged by an overprinted colour lacquer layer. The layer thickness of the colour lacquer layer is to be matched to the line frequency of the relief structure with the result that the desired result is achieved. In particular with rougher structures, i.e. structures with lower line frequency, a thicker colour lacquer layer can be used. A thinner lacquer layer can be used in particular with finer structures, i.e. structures with higher line frequency.

According to a preferred development of the invention the replication lacquer layer and the colour lacquer layer have refractive indices the values of which differ by at least 0.1, in particular at least 0.2. This preferred embodiment of the invention uses the knowledge that the diffractive effect of the relief structure can be destroyed by the usually very similar refractive indices of replication lacquer and colour lacquer and can be prevented or at least reduced by a choice of replication lacquer and colour lacquer with the strongest possible difference in refractive indices.

As the majority of pigments have a refractive index different from the lacquer binder and thereby the pigmented lacquer has overall a refractive index different from that of the unpigmented lacquer, the pigment proportion in the colour lacquer can set a refractive index of the whole colour lacquer layer which deviates from the refractive index of the replication lacquer layer by a desired difference.

According to a preferred development of the invention overlaying of the surface of the relief structure with the colour lacquer layer, the thickness of the colour lacquer layer, the depth and frequency of the relief structure and the refractive index of the replication lacquer layer and the colour lacquer layer are matched to one another and combined such that a desired optical effect results. The following rules of thumb are to be borne in mind:

- the less the overlaying of the surface with the colour lacquer layer is, the greater the surface of the "unfilled" relief structure and, consequently, the more visible the diffractive effect.
- the smaller the thickness of the colour lacquer layer, the less filled the relief structure by the colour lacquer and, consequently, the more visible the diffractive effect.
- the greater the depth of the relief structure and the greater the distance between the relief elements, the less filled the relief structure by the colour lacquer and, consequently, the more visible the optical effect of the relief structure.
- the greater the difference in refractive index between replication lacquer layer and colour lacquer layer, the stronger the reflection at the boundary surface of replication lacquer and colour lacquer layer and, consequently, the more visible the diffractive effect.

Converse tendencies can be used for compensation. For example the visibility of the diffractive effect in the areas of the relief structure overprinted with colour lacquer increases due to a relatively large difference in refractive index of approx. 0.2. Consequently, in contrast, the overlaying of the surface with the colour lacquer can be somewhat increased without the visibility of the diffractive effect suffering a substantial decrease overall.

In a preferred embodiment, on a second side of the replication lacquer layer the film has a protective lacquer layer which protects the layers arranged beneath it, such as replication lacquer layer, colour lacquer layer and reflective layer, against damaging mechanical and chemical action. This can be a single lacquer layer or also several lacquer layers applied one on top of the other. Preferably each protective lacquer layer has a thickness of from 1 to 5 µm.

Such a protective lacquer layer can for example be formed from a lacquer of the following composition (in g):

| | |
|---|---|
| Methyl ethyl ketone | 4000 |
| Butanol | 300 |
| Methyl methacrylate-based acrylic polymer (Molecular weight approx. 250,000-300,000 au) | 1500 |

In a preferred embodiment, on the first side of the replication lacquer layer the film has an adhesive layer which covers the replication lacquer layer, the colour lacquer layer and the reflective layer. This adhesive layer can be printed onto the first side of the replication lacquer layer in the production process after step c).

By means of this adhesive layer the entire sequence of layers of the film can be joined securely to a substrate, e.g. a security paper, in particular banknote paper, a value document, a product surface or a product packaging, with the result that an attempt to detach the film leads to its destruction. The adhesive layer can have a thickness of from 1 to 10 µm. If this is a thermally activatable adhesive, the film element can be affixed to a substrate in a hot foil stamping process.

Alternatively, the film can be part of a transfer film as used for the production of security elements. The transfer film has a carrier film and the film which can be detached from the carrier film according to one of claims 1 to 11 in the form of a transfer layer. In this case the layer structure of the transfer layer is prepared on the carrier film and then transferred, in a hot foil stamping process, into the desired outline contours on a security paper or a value document such as a banknote, an identity card or the like. The carrier film is quite generally a printable web-shaped material, for example a plastic film made of polyethylene, polypropylene, polyvinyl acetate, polyamide, polyester, polyethylene terephthalate or similar substances. The thickness of the carrier film is preferably 6 to 250 µm, more preferably 10 to 50 µm. The detachability of the transfer layer from the carrier film can be achieved by a detachment layer arranged between the carrier film and the transfer layer. The detachment layer is for example a waxy layer and preferably has a thickness of from 0.01 to 0.5 µm.

The film can also have further security features such as a thin layer structure, a print image or similar. If the film is arranged in the form of a security element on the surface of a security paper or value document, it can have any outline structures, such as for example round, oval, stellate, rectangular, trapezoidal or strip-form outline contours.

According to a preferred embodiment the security paper or the value document onto which the film is applied in the form of a security element has a continuous opening or a transparent area. The security element is arranged here in the region of the opening or of the transparent area and protrudes from this in particular on all sides. In this case the security element can be checked from the front and back. It is particularly advantageous if the adhesive layer is as transparent as possible, in order that the reflective layer can be seen from the back. Through the possibility of viewing the security element from both sides it can be recognized that the security element has a different design on the front from that on the back. On the front, reflective layer is covered in areas with the colour lacquer layer and the security element is formed in two colours as a result. On the back, the colour lacquer layer is covered by the reflective layer over the whole surface or in areas in order that as a result a different optical impression arises on the back of the security element. This represents a particularly eye-catching and striking property of the security element.

According to a preferred embodiment the process takes place from roll to roll, i.e. in a continuous process, preferably using pressure cylinders, with which successive individual layers of the film or of the transfer film are applied to a carrier film. Individual layers of the film, in particular the colour lacquer layer, can be printed, preferably using gravure, silk screen or flexographic printing.

In a preferred embodiment firstly the replication lacquer layer is printed onto a carrier film before the relief structure is formed in the replication lacquer layer. The relief structure can be formed in a thermal replication process by means of a heated replication roller which stamps its relief into the replication lacquer layer. Optionally, a detachment layer can still be printed onto the carrier film before the replication lacquer layer is printed on.

Although, in the process according to the invention, e.g. with a thermal replication of the diffractive relief structure, non-linear distortions of the film can occur, this happens before the colour lacquer is applied. It is thereby relatively simple to maintain a required register tolerance because very little heat acts on the film with colour lacquer printing, in particular gravure, silk screen or flexographic printing. The non-linear distortions on the film can be measured or recorded by sensors before the colour lacquer is printed and optionally compensated for by adjusting the printer rollers or other elements. For example an angled distortion of the film can be compensated for in this way.

In a preferred embodiment the colour lacquer layer is arranged registered relative to the relief structure, preferably by means of a printing process. The registration accuracy, also called register tolerance, is preferably in a range of from 100 to 1000 µm, preferably of from 200 to 600 µm. A register tolerance of at most 1 mm is indispensible in security applications in the field of value documents. It has proved advantageous if register tolerances are regulated by means of optically detectable register marks. In a first step these register marks can be applied to the carrier film unwound from a supply roll, e.g. by printing or stamping, and always serve as reference points during the further production steps.

In this way a distortion of the replication lacquer layer caused by a thermal replication of the diffractive relief structure can be recognized by an optical detection of the register mark arranged on the carrier film and compensated for by a corrective adjustment of a printing roll or a conveyor element.

Preferably the total transparency of the layers of protective lacquer layer+replication lacquer layer+colour lacquer layer, lying above the reflective layer, is 50%, in particular 80%, of the incident visible light in the wavelength range of 380 to 780 nm.

BRIEF DESCRIPTION OF THE DRAWINGS

The invention is explained below with reference to several embodiment examples with the aid of the attached drawings. The representations are schematized and do not correspond to the actual ratios and proportions. There are shown in.

DETAILED DESCRIPTION OF THE INVENTION

Figure 1:
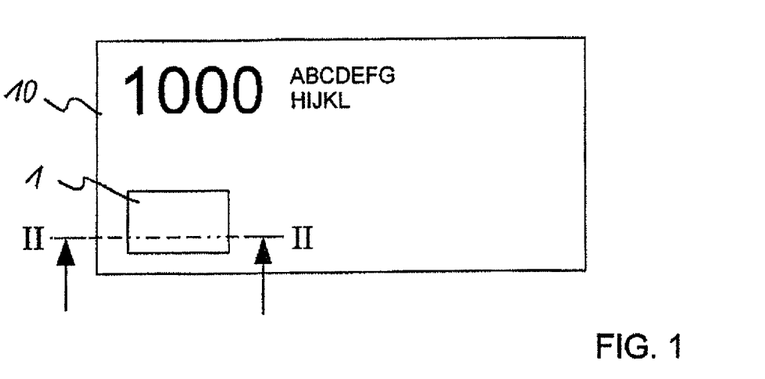
FIG. 1 a value document according to the invention.

FIG. 1 shows a top view of a value document according to the invention. The example shown is a banknote 10 with a value detail and a further imprint on the front of the banknote 10. Below the value detail the banknote also has a rectangular security element 1 which is affixed to the surface of the banknote paper.

The security element 1 represented in FIG. 1 is a film element which has a replication lacquer layer with a diffractive relief structure, e.g. in the form of a surface hologram, a transparent colour lacquer layer and a metallic reflection layer.

Figure 2:
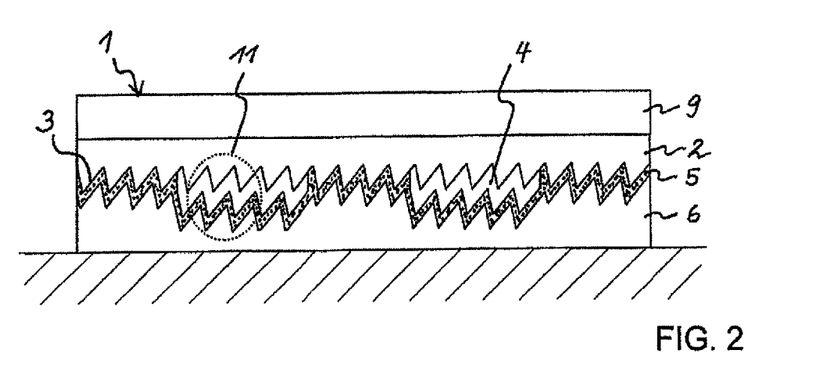
FIG. 2 a section through a film according to the invention along the line II-II, FIG. 3 a detail of the layer structure of a film according to the invention with a relatively thin colour lacquer layer, FIG. 4 a detail of the layer structure of a film according to the invention with a relatively thin colour lacquer layer, FIG. 5 a section through a transfer film according to the invention, FIG. 6 a section through a film according to the invention with four different areas, FIG. 7 a top view of a relief structure with a colour lacquer layer in the form of a line grid, and FIG. 8 a top view of a relief structure with a colour lacquer layer in the form of a dot grid.

FIG. 2 shows a cross-section through the security element 1 along the line II-II in FIG. 1. The replication lacquer layer 2 can be recognized into the side of which facing the banknote paper 10 the diffractive relief structure 3 is moulded. This is a linear structure in the form of an asymmetrical sawtooth pattern. A preferred depth, i.e. height difference between valley and peak, of the linear structure is in the region of 300 nm.

The transparent colour lacquer layer 4 is arranged directly on the relief structure 3 only in areas. The whole relief structure 3 together with the colour lacquer layer 4 is covered by a reflective metal layer 5 which was applied by means of vacuum deposition or sputter deposition. For example, a vapour-deposited aluminium layer with a thickness of 40 nm is involved.

The metal layer 5 covers the colour lacquer layer 4 and improves the visibility of the diffractive optical effect of the film element 1, as a result of its reflective effect. There is printed on the side of replication lacquer layer 2 facing away from the banknote paper 10 a transparent or translucent protective lacquer layer 9 which protects the layers 2, 4, 5 arranged beneath it against mechanical and chemical action. The whole layer sequence 2, 4, 5, 9 is joined by means of an adhesive layer 6 so securely to the banknote paper 10 that an attempt to detach the film element 1 will result in its destruction.

An observer views the security element 1 in reflected light which travels through the protective lacquer layer 9, the replication lacquer layer 2 and areas of the colour lacquer layer 4 up to the reflective layer 5. The majority of the light arriving at the reflective layer 5 is reflected at the reflective layer 5 according to its reflectivity and passes through the layers 4, 2, 9 of the film element 1 in the opposite direction. The light striking the eye of the observer consists on the one hand of a first portion which originates from areas with colour lacquer layer 4, and of a second portion which originates from areas without colour lacquer layer 4. The first light portion contains a colour component according to the colour lacquer layer 4. The second light portion contains colour components according to the protective lacquer layer 9 and replication lacquer layer 2 through which it has passed, but has none of the colour components originating from the colour lacquer layer 4.

Figure 3:
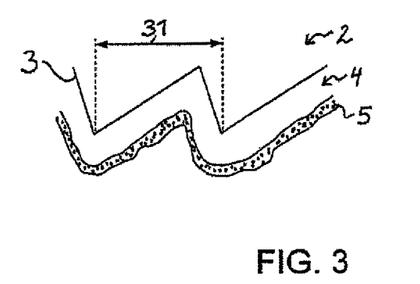

In the area of a section 11 of the film 1 specified in FIG. 2, FIG. 3 shows a first embodiment example of the transparent colour lacquer layer 4. The colour lacquer layer 4 is applied to the diffractive relief structure 3 so thinly that the valleys of the relief structure 3 were only partially filled. On the side of the colour lacquer layer 4 facing away from the relief structure 3 the colour lacquer layer 4 has features of the relief structure 3, such as the relief frequency 31 as well as substantially also the relief depth 30. For such an embodiment of the colour lacquer layer 4 the depth and frequency 31 of the relief structure 3 is to be matched to the thickness of the colour lacquer layer 4. For example the relief depth lies in the region of 300 nm, while the colour lacquer layer has a thickness in the region of 200 nm.

Figure 4:
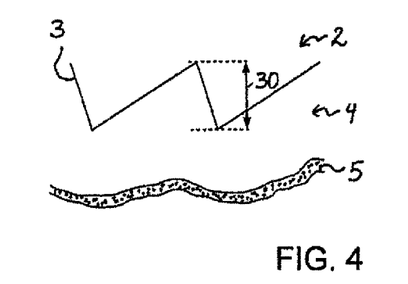

Likewise in the area of the section 11 of the film 1 specified in FIG. 2, FIG. 4 shows a second embodiment example of the transparent colour lacquer layer 4. The colour lacquer layer 4 is applied to the diffractive relief structure 3 so thickly that the valleys of the relief structure 3 were completely filled. On the side of the colour lacquer layer 4 facing away from the relief structure 3, the relief frequency 31 is only weak, and the relief depth 30 can no longer be recognized at all because the relief structure 3 is completely filled. For example the relief depth 30 lies in the region of 300 nm, while the colour lacquer layer has a thickness in the region of 3000 nm.

Figure 5:
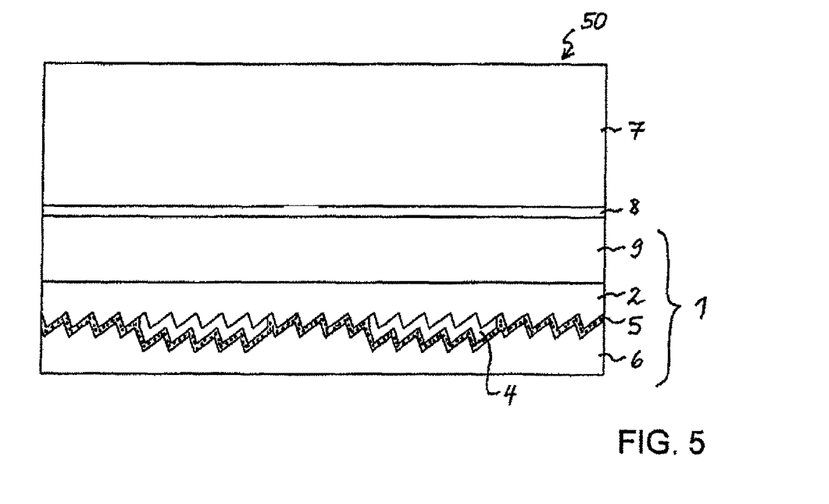

FIG. 5 shows a section through a transfer film 50 according to the invention consisting of a carrier layer 7 and a transfer layer 1, between which is arranged a detachment layer 8. The transfer layer 1 is formed analogous to the film 1 shown in FIG. 2, comprising in this sequence a protective lacquer layer 9 directly abutting the detachment layer 8, a replication lacquer layer 2, a partial colour lacquer layer 4, a reflective layer 5 as well as an adhesive layer 6.

The transfer film 50 is printed onto a substrate under the action of heat, with the result that the adhesive layer 6 is activated and joins to the substrate. The carrier film 7 is then detached from the transfer layer 1 which remains on the substrate as security element.

Figure 6:
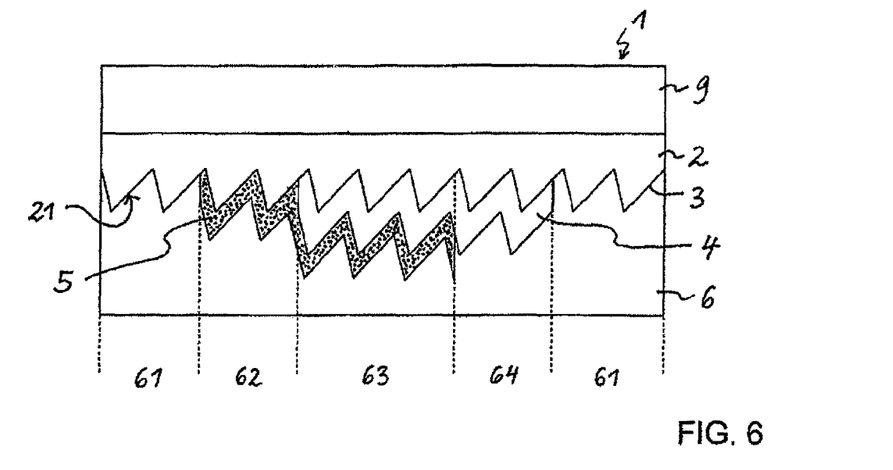

FIG. 6 shows a section through a film 1 according to the invention similar to the film shown in FIG. 2. FIG. 6 shows four different possibilities for forming the colour lacquer layer 4 and the reflective layer 5.

In a first area 61 neither the colour lacquer layer 4 nor the reflective layer 5 is present, with the result that the adhesive layer 6 directly abuts the relief structure 3. In many cases, customary adhesive layers have a refractive index very similar to customary replication lacquer layers, in particular with a difference of less than 0.1. As a result, in the first area 61 the optical effect of the relief structure 3 can be destroyed by the directly adjacent adhesive layer 6.

In a second area 62 only the reflective layer 5 is formed which is arranged directly on the relief structure 3. The adhesive layer 6 is arranged on the side of the reflective layer 5 facing away from the replication lacquer layer 2.

A third area 63 shows an embodiment in which the colour lacquer layer 4 and the reflective layer 5 overlap. As the reflective layer 5 is applied only once the colour lacquer layer 4 has been applied, in this case the colour lacquer layer 4 is arranged between the replication lacquer layer 2 and the reflective layer 5. The colour lacquer layer 4 thereby colours the reflective layer 5 on the side facing the replication lacquer layer 2. The adhesive layer 6 is arranged on the side of the reflective layer 5 facing away from the colour lacquer layer 4. The reflective layer 5 is therefore not dyed by the colour lacquer layer 4 on the side facing the adhesive layer 6.

A fourth area 64 shows a case in which only the colour lacquer layer 4 is present which directly abuts the replication lacquer layer 2. The adhesive layer 6 is arranged on the side of the colour lacquer layer 4 facing away from the replication lacquer layer 2. As in preferred embodiments all the layers 9, 2, 4, 6 lying on a substrate are transparent in area 64, the dyed transparent colour lacquer layer 4 practically colours in the substrate abutting the adhesive layer 6 or overlays an existing colour of the substrate.

Figure 7:
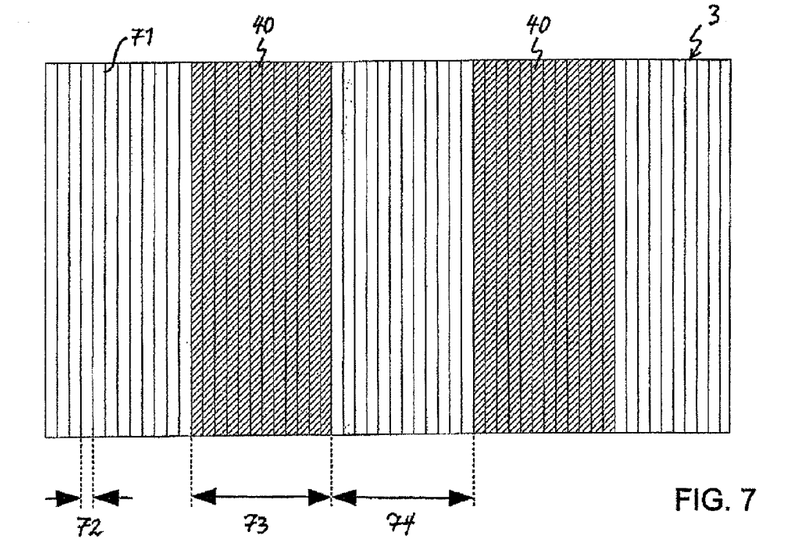

FIG. 7 shows a top view of a diffractive relief structure 3 which is designed in the form of a linear structure 71, e.g. an asymmetrical sawtooth structure. The individual linear elements 71 are at a distance 72 from one another. A colour lacquer layer is now printed on this relief structure 3 in the form of strips 40 with a width 73 and a reciprocal distance 74. Preferred values for the width 73 and the distance 74 of the linear structure 3 lie in the range of from 150 to 200 μm. In the present example both the line width 73 and the distance 74 of the colour lacquer elements 40 are fixed such that they each comprise twelve linear elements 71 of the relief structure 3. Assuming a frequency of the relief structures, i.e. a distance 72 between adjacent linear elements 71, in the region of approx. 10 μm, both the width 73 and the distance 74 are approx. 120 μm each.

Figure 8:
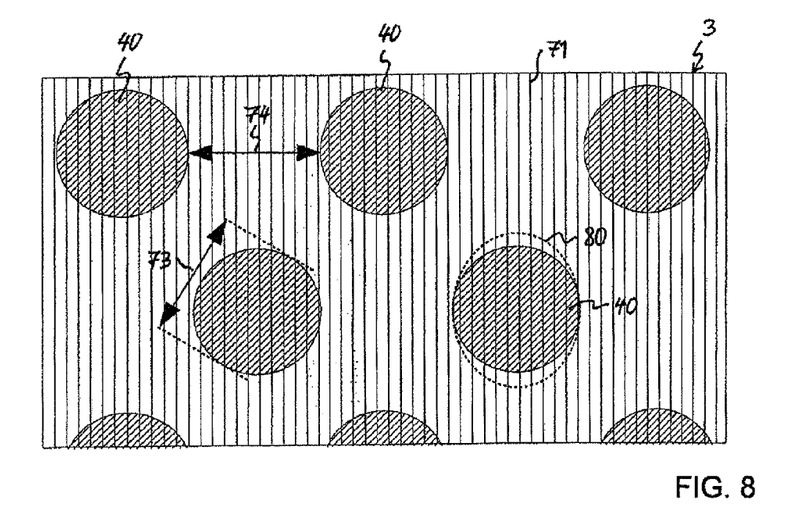

FIG. 8 shows a top view of a diffractive relief structure 3 similar to that in FIG. 7. In contrast to the embodiment represented in FIG. 7 the colour lacquer layer shown in FIG. 8 has the form of a dot grid 40. Also in this case a width 73 of the individual elements 40 of the colour lacquer layer as well as a reciprocal distance 74 of the individual elements of the colour lacquer layer can be defined. The diameter 73 and the distance 74 are preferably chosen such that they lie beneath the resolution capacity of the naked human eye. In this way the colour lacquer layer, formed from individual elements 40, looks to an observer like an uninterrupted colour layer.

The resolution capacity of the naked eye depends, among other things, on the contrast between the individual colour lacquer layer elements 40 and a reflective layer visible in-between. The smaller the brightness contrast between an individual colour lacquer layer element and an adjacent visible reflective layer, the more difficult it is for an observer to recognize these two different layers as such, i.e. to optically resolve them. If the colour lacquer layer is for example dyed yellow and the reflective layer is formed as an aluminium layer with a silver appearance, the brightness contrast between these two layers is relatively small, which strengthens the impression of an uninterrupted colour lacquer layer.

When printing the colour lacquer layer on it is to be borne in mind that the linear structure 71 can exert a capillary effect on the colour lacquer in the direction of the lines 71, with the result that, along the lines 71, the colour lacquer elements experience a widening relative to the direction perpendicular to the lines 71 which lies in the range of from 15 to 35%. Applied to the dot elements 40 of FIG. 8 elliptical elements 40 would thus result as indicated in FIG. 8 by the dotted shape 80.

LIST OF REFERENCE NUMBERS

1 Film
2 Replication lacquer layer
3 Relief structure
4 Colour lacquer layer
5 Reflective layer
6 Adhesive layer
7 Carrier film
8 Detachment layer
9 Protective lacquer layer
10 Value document
11 Section
21 first side of the replication lacquer layer
30 Depth of the relief structure
31 Frequency of the relief structure
40 Pattern or grid element
50 Transfer film
61 first area
62 second area
63 third area
64 fourth area
71 linear structure
73 line width, dot or individual element diameter
74 distance
80 elliptical form

The invention claimed is:

1. A film comprising:
a light-permeable replication lacquer layer with a diffractive relief structure formed in a first side of the replication lacquer layer;
a light-permeable colour lacquer layer, formed only in areas, arranged on the relief structure; and
a reflective layer, formed at least in areas, arranged on the first side of the replication lacquer layer,
wherein, in areas of the film in which the colour lacquer layer and the reflective layer overlap, the colour lacquer layer is arranged between the replication lacquer layer and the reflective layer, and
wherein the colour lacquer layer is formed in a pattern or as a grid, and
wherein:
i) a distance between adjacent pattern or grid elements of the colour lacquer layer lies in a range of from 50 to 250 μm, and/or
ii) a line width, a dot diameter or an individual element diameter of the pattern or grid elements lies in a range of from 50 to 250 μm, and
wherein the colour lacquer used to form the colour lacquer layer is more strongly dyed if the overlaying of the surface of the relief structure with the colour lacquer layer is less.

2. A film according to claim 1, wherein the colour lacquer layer has a thickness in a range of from 0.1 to 6 μm.

3. A film according to claim 1, wherein the overlaying of the surface of the relief structure with the colour lacquer layer lies in a range of from 5 to 95%, of the whole surface of the relief structure.

4. A film according to claim 1, wherein the depth of the relief structure lies in a range of from 50 to 1000 nm.

5. A film according to claim 1, wherein the relief structure is a linear structure with a line frequency in a range of from 100 to 1000 lines/mm.

6. A film according to claim 1, wherein the replication lacquer layer and the colour lacquer layer have refractive indices the values of which differ by at least 0.1.

7. A film according to claim 1, wherein, on a second side of the replication lacquer layer, the film has a protective lacquer layer.

8. A film according to claim 1, wherein, on the first side of the replication lacquer layer, the film has an adhesive layer which covers the replication lacquer layer, the colour lacquer layer and the reflective layer.

9. A security paper for the production of value documents which has at least one film according to claim 1 in the form of a security element.

10. A value document which has at least one film according to claim 1 in the form of a security element.

11. A transfer film for the production of security elements, which has a carrier film and a film according to claim 1, which can be detached from the carrier film in the form of a transfer layer.

12. A transfer film according to claim 11, wherein a detachment layer is arranged between the carrier film and the transfer layer.

13. A process for producing a film, wherein
   a) a diffractive relief structure is formed in a first side of a light-permeable replication lacquer layer,
   b) after step a), a light-permeable colour lacquer layer is applied only in areas to the relief structure, with the result that the colour lacquer layer is formed in a pattern or as a grid, wherein
      i) a distance between adjacent pattern or grid elements of the colour lacquer layer lies in a range of from 50 to 250 μm, and/or
      ii) a line width, a dot diameter or an individual element diameter of the pattern or grid elements lies in a range of from 50 to 250 μm, and
   c) after step b), a reflective layer is applied at least in areas to the first side of the replication lacquer layer, and
   wherein the colour lacquer used to form the colour lacquer layer is more strongly dyed if the overlaying of the surface of the relief structure with the colour lacquer layer is less.

14. A process according to claim 13, wherein the process takes place roll-to-roll.

15. A process according to claim 13, wherein the colour lacquer layer is printed.

16. A process according to claim 13, wherein the colour lacquer layer is arranged registered relative to the relief structure, with a register tolerance in the range of from 100 to 1000 μm.

17. A process according to claim 13, wherein the replication lacquer layer is printed on a carrier film before step a).

18. A process according to claim 13, wherein in step c) the reflective layer is partially removed.

19. A process for producing a film, wherein
   a) a diffractive relief structure is formed in a first side of a light-permeable replication lacquer layer,
   b) after step a), a light-permeable colour lacquer layer is applied only in areas to the relief structure, with the result that the colour lacquer layer is formed in a pattern or as a grid, wherein
      i) a distance between adjacent pattern or grid elements of the colour lacquer layer lies in a range of from 50 to 250 μm, and/or
      ii) a line width, a dot diameter or an individual element diameter of the pattern or grid elements lies in a range of from 50 to 250 μm, and
   c) after step b), a reflective layer is applied at least in areas to the first side of the replication lacquer layer, and
   wherein the replication lacquer layer is printed on a carrier film before step a), and
   wherein a distortion of the replication lacquer layer caused by a thermal replication of the diffractive relief structure is recognized by an optical detection of the register mark arranged on the carrier film and compensated for by an adjustment of a printing roll or a conveyor element.

* * * * *